US009530082B2

(12) United States Patent
Abdulkader et al.

(10) Patent No.: US 9,530,082 B2
(45) Date of Patent: Dec. 27, 2016

(54) OBJECTIONABLE CONTENT DETECTOR

(71) Applicant: Facebook, Inc., Menlo Park, CA (US)

(72) Inventors: Ahmad Abdulmageed Mohammed Abdulkader, Palo Alto, CA (US); Giridhar Rajaram, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 45 days.

(21) Appl. No.: 14/695,691

(22) Filed: Apr. 24, 2015

(65) Prior Publication Data

US 2016/0314380 A1 Oct. 27, 2016

(51) Int. Cl.
*G06K 9/00* (2006.01)
*G06K 9/66* (2006.01)
*G06K 9/62* (2006.01)

(52) U.S. Cl.
CPC ............. *G06K 9/66* (2013.01); *G06K 9/6201* (2013.01)

(58) Field of Classification Search
CPC ............ G06T 2207/20081; G06T 2207/20084; G06K 9/62–9/72
See application file for complete search history.

(56) References Cited

U.S. PATENT DOCUMENTS

| | | | | |
|---|---|---|---|---|
| 8,345,921 B1 * | 1/2013 | Frome | ...................... | G06K 9/72 382/103 |
| 8,510,252 B1 * | 8/2013 | Gargi | ................. | G06K 9/00523 706/52 |
| 8,909,563 B1 * | 12/2014 | Jing et al. | .......... | G06K 9/00664 382/180 |
| 8,958,630 B1 * | 2/2015 | Gallup | ................. | G06K 9/6293 382/159 |
| 9,405,976 B2 * | 8/2016 | Dunlop | .............. | G06K 9/00718 |
| 2004/0207878 A1 * | 10/2004 | Ferlitsch | ............ | H04N 1/00843 358/2.1 |
| 2006/0018516 A1 * | 1/2006 | Masoud | ............ | G06K 9/00342 382/115 |
| 2008/0159624 A1 * | 7/2008 | Sathish | .............. | G06K 9/00369 382/170 |
| 2008/0159627 A1 * | 7/2008 | Sengamedu | ....... | G06K 9/00362 382/190 |
| 2009/0157571 A1 * | 6/2009 | Smith | .................. | G06K 9/6292 706/12 |
| 2009/0274364 A1 * | 11/2009 | Shakya | .............. | G06K 9/00362 382/165 |

(Continued)

*Primary Examiner* — Aaron W Carter
(74) *Attorney, Agent, or Firm* — Perkins Coie LLP

(57) ABSTRACT

A arbitrated image classifier can be trained to identify whether an image contains specified features, such as sexual, violent, or other potentially objectionable content. An arbitrated image classifier can include a configuration of classifiers and an arbitrator that determines a final image classification based on classification results from the classifiers. An arbitrated image classifier can be trained to identify image features by dividing images labeled as including or not including a specified feature into portions, which are provided to the classifiers of the arbitrated image classifier. The arbitrator of the arbitrated image classifier can determine a result for whether or not the image includes the specified feature. If the final result does not match the image label, parameter values for various of the classifiers or the arbitrator combining procedure can be adjusted. A trained arbitrated image classifier can then be used to determine whether new images include the particular feature.

20 Claims, 6 Drawing Sheets

(56) References Cited

U.S. PATENT DOCUMENTS

| | | | |
|---|---|---|---|
| 2009/0310854 A1* | 12/2009 | Mei | G06K 9/342 382/159 |
| 2010/0014755 A1* | 1/2010 | Wilson | G06K 9/00604 382/173 |
| 2010/0217732 A1* | 8/2010 | Yang | G06N 99/005 706/21 |
| 2010/0318477 A1* | 12/2010 | Perronnin | G06N 7/00 706/12 |
| 2011/0007970 A1* | 1/2011 | Saund | G06K 9/00449 382/176 |
| 2011/0052063 A1* | 3/2011 | McAuley | G06K 9/527 382/180 |
| 2011/0170769 A1* | 7/2011 | Sakimura | G06K 9/623 382/159 |
| 2011/0293136 A1* | 12/2011 | Porikli | G06K 9/00771 382/103 |
| 2012/0123978 A1* | 5/2012 | Toderice | G06F 17/30799 706/12 |
| 2012/0269436 A1* | 10/2012 | Mensink | G06K 9/00624 382/180 |
| 2013/0183951 A1* | 7/2013 | Chien | H04W 4/003 455/418 |
| 2013/0188842 A1* | 7/2013 | Hauke | G06K 9/00288 382/115 |
| 2013/0259375 A1* | 10/2013 | Dunlop | G06K 9/00684 382/173 |
| 2013/0259390 A1* | 10/2013 | Dunlop | G06K 9/00718 382/224 |
| 2014/0029839 A1* | 1/2014 | Mensink | G06K 9/6272 382/159 |
| 2015/0110387 A1* | 4/2015 | Lienhart | G06F 17/30256 382/159 |
| 2015/0131868 A1* | 5/2015 | Rooyakkers | G06K 9/00248 382/110 |
| 2015/0254532 A1* | 9/2015 | Talathi | G06K 9/66 382/156 |
| 2016/0070986 A1* | 3/2016 | Chidlovskii | G06K 9/00785 382/104 |
| 2016/0140727 A1* | 5/2016 | Yilmaz | G06T 7/204 382/103 |
| 2016/0171340 A1* | 6/2016 | Fleishman | G06K 9/481 382/159 |
| 2016/0217344 A1* | 7/2016 | Misra | G06K 9/6227 |

* cited by examiner

OBJECTIONABLE CONTENT DETECTOR

BACKGROUND

As the Internet becomes integrated into almost every aspect of people's lives, the amount of content users provide is growing at an exponential rate. It is common for web providers to operate databases with petabytes of data, while leading content providers are already looking toward technology to handle exabyte implementations. One social networking website, for example, has attracted over a billion users who have posted over 250 billion photos, with another 350 million photos being posted each day.

Many of these images are viewable by users other than the image posters, such as the posters friends, members of affiliated groups, or the general public. Some of these images may contain content that some users may find objectionable, such as sexual content, violent scenes, drug use, etc. However, due to the sheer volume of images, it is infeasible for each image to have human review prior to being available to other users. Furthermore, what is considered "objectionable" can vary, such as by location or user age. Thus, images can require multiple levels of classifications such as "objectionable to users under age 18," "objectionable to users who have been identified as not wanting to see violent images," or "objectionable to users who are associated with religion X."

Several computational approaches have been attempted to identify images as containing objectionable content. For example, neural networks have been used to analyze images and classify them as containing sexual content or not. As another example, object recognition techniques have been applied to identify objects in images that may be found objectionable. However, these methods of identifying objectionable content are prone to accuracy errors.

BRIEF DESCRIPTION OF THE DRAWINGS

The techniques introduced herein may be better understood by referring to the following Detailed Description in conjunction with the accompanying drawings, in which like reference numerals indicate identical or functionally similar elements.

DETAILED DESCRIPTION

Figure 1:
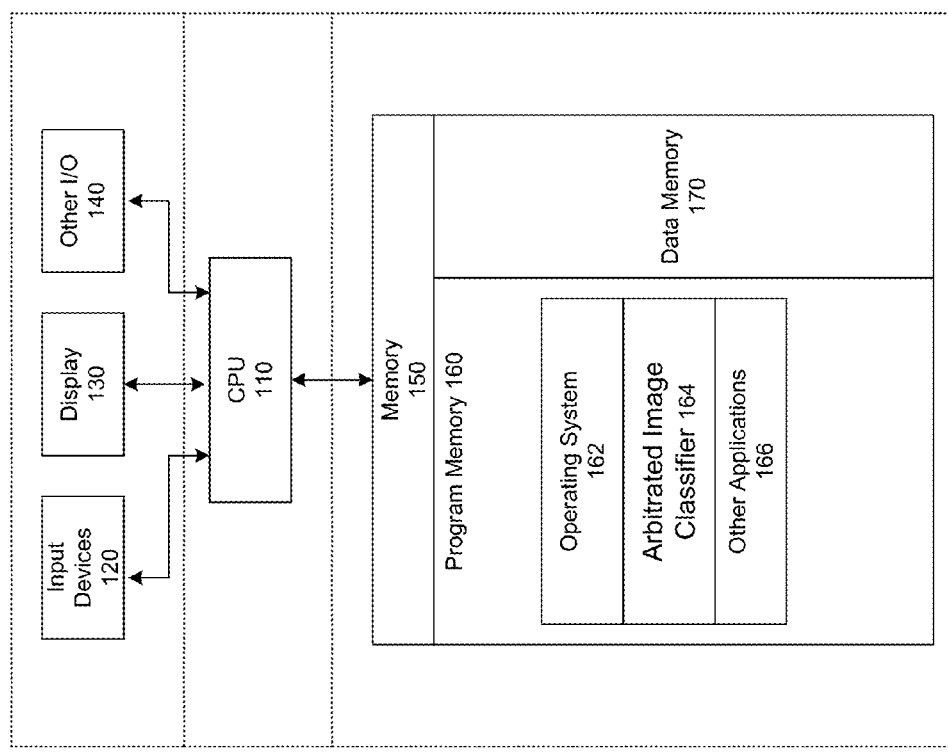
FIG. 1 is a block diagram illustrating an overview of devices on which some implementations of the disclosed technology can operate.

Creating and applying arbitrated image classifiers is disclosed. An arbitrated image classifier system can be trained to identify whether an image contains specified features, such as sexual, violent, other potentially objectionable content, or other image features. An arbitrated image classifier can include a configuration of multiple classifiers and an arbitrator that determines a final image classification based on classification results from the multiple classifiers. An arbitrated image classifier can be trained to identify image features by dividing into portions images labeled as including or not including a specified feature. Each image portion can be matched to a classifier (e.g., a deep neural network), where the matching can be based on the region of the image that image portion came from. Each classifier can generate a result, and the results can be provided to an arbitrator, which provides a final classification for whether or not the image includes the specified feature. If the final classification does not match the label of the image, parameters or weight values for various of the multiple classifiers or the arbitrator can be adjusted. Once the arbitrated image classifier is trained for a particular feature, images without a known label can be split into image portions which can be provided to the trained arbitrated image classifier to determine whether the image includes the particular feature.

By first dividing an image into portions, classifying each portion individually, and then reaching a final determination based on a combination of the classifications, a greater level of accuracy for identifying particular features can be achieved. This is particularly true for images where the feature for which the arbitrated image classifier is trained is often in the image background or otherwise not prominently displayed in the image.

As an example, the arbitrated image classifier system can include ten deep neural networks, each corresponding to a general zone across images. A series of images can be labeled as either containing sexual content or not. The arbitrated image classifier system can then divide each image into ten image portions using an algorithm that can, for example, be based on an analysis of where sexual content is likely to be within images. For each image, the arbitrated image classifier system can then match each of the ten image portions to one of the ten deep neural networks based on that image portion originating from an area of the image corresponding to the zone assigned to the matched deep neural network. Each deep neural network can then be used to classify its matched image portion as having sexual content or not. These results can then be provided to an arbitrator. In this example, the arbitrator uses a weighted average of the classifier results to determine a final image classification value. This value is then used to adjust the parameters for the deep neural networks as well as the weights for their results. As the series of images is processed, the arbitrated image classifier system improves its ability to correctly classify whether images have sexual content.

As used herein, a "patch" is an image portion that can be supplied to a classifier. In some implementations, a patch can be a defined region of an image. However, as discussed below in relation to FIG. 4, a patch can be delineated in other ways, such as by color, using object identification within the image, or based on edge analysis. As used herein, an "arbitrator" is a module that makes a determination regarding whether an image has a feature based on input from multiple other classifiers. As also discussed below in relation to FIG. 4, an arbitrator can combine classifier input in numerous ways such as using an average, weighted average, or default unless a threshold number of classifiers overturns the default, etc. In some implementations, the arbitrator is not programmed with a specific combination algorithm, but relies on the training process to control how the arbitrator selects a result from among the inputs of the multiple classifiers.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that can implement an arbitrated image classifier system. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, arbitrated image classifier 164, and any other application programs 166. Memory 150 also includes data memory 170 that can include patching algorithms and templates, labeled images, neural network or other classifier constructors, objectionable content classifications, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
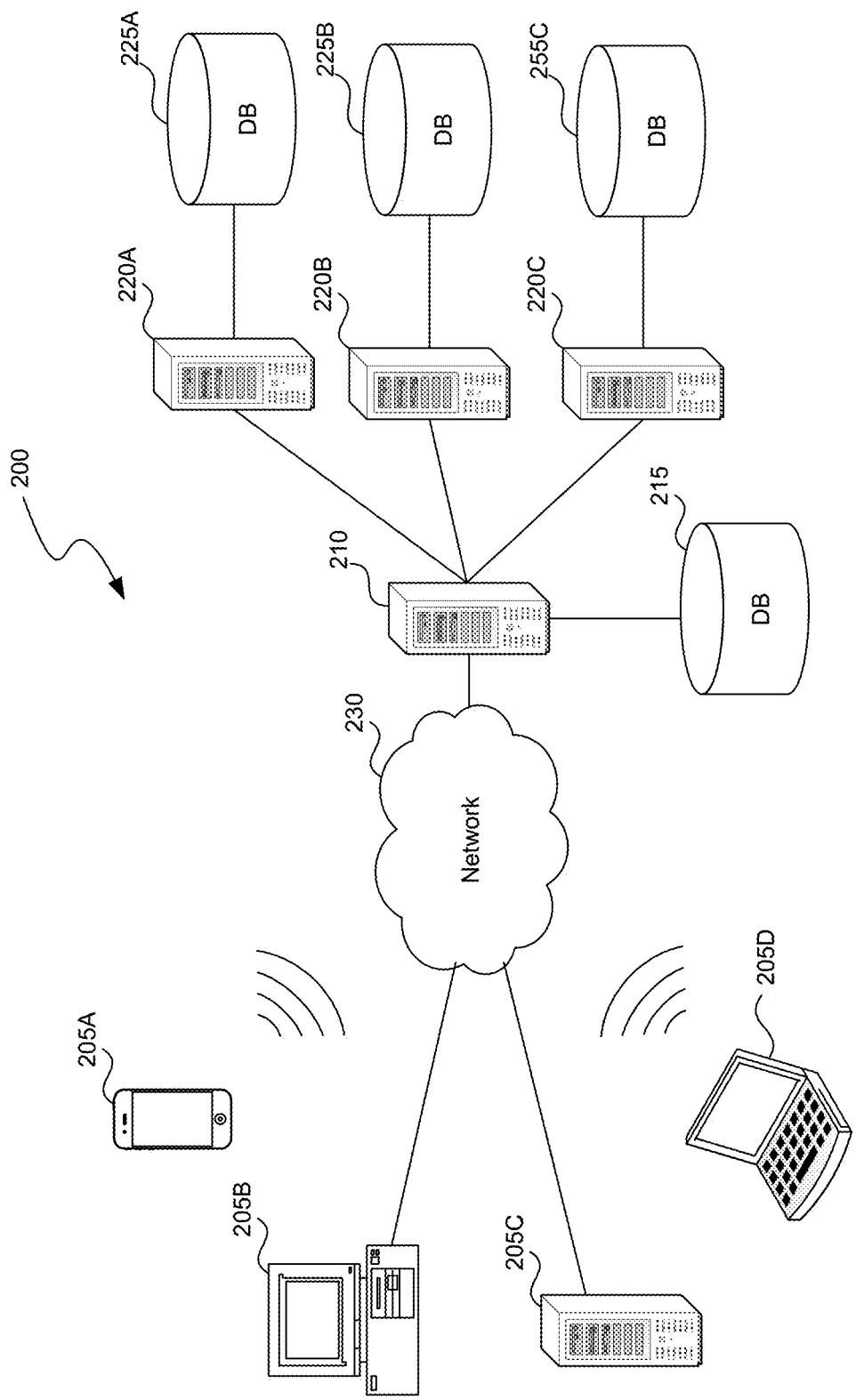
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210, through network 230, to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as classified or unclassified images, content classification labels, and identified user characteristics. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
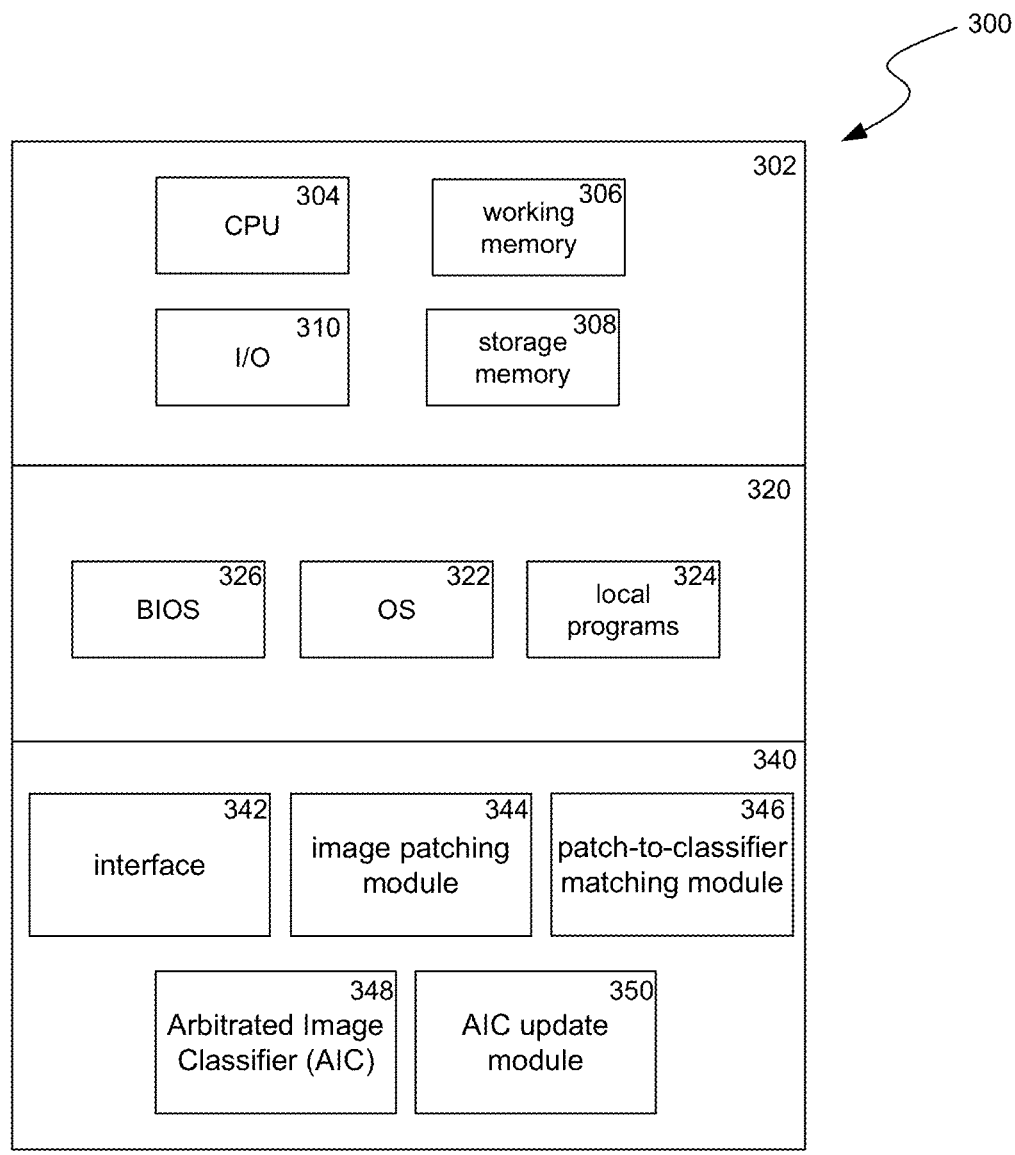
FIG. 3 is a block diagram illustrating components which, in some implementations, can be used in a system employing the disclosed technology.

FIG. 3 is a block diagram illustrating components 300 which, in some implementations, can be used in a system implementing of the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include image patching module 344, patch-to-classifier matching module 346, arbitrated image classifier 348, arbitrated image classifier update module 350, and components which can be used for controlling and receiving data from the specialized components, such as interface 342.

Image patching module 344 can receive, through interface 342, an image. Images can be sourced from a variety of origins such as posts to a social media or other website, an established image collection, news or magazine articles, company promotional material, a direct feed from an image capture device, security or other monitoring devices, etc. Images can also come from a variety of formats such as still images, frames from video, composites, drawings, animation, etc. Images can be in a variety of types, sizes, and encodings. The image patching module 344 can apply a patching algorithm to the received image to create a number of patches. In some implementations, the number of patches created can correspond to the number of classifiers in arbitrated image classifier 348. In various implementations, the patching algorithm can select random or semi-random areas, apply an established patching template, or base patch creation on identified objects or edges. In some implementations, the way an image is divided into patches can depend on characteristics of the image such as its source, size, type, whether it contains identified objects, etc. In some implementations, patches can be of different types. For example, a received image can be divided into ten patches based on an established patch template, four additional patches can be created based on recognized objects in the image, and three additional patches can be created for the red, green and blue hues in the image. In some implementations, the created patches can include overlapping information. In implementations where an arbitrated image classifier is being trained, the received image can already be associated with a label indicating whether or not it has the feature for which the arbitrated image classifier is being trained. Dividing an image into patches is further described below in relation to block 408 of FIG. 4 and block 508 of FIG. 5.

Patch-to-classifier matching module 346 can receive the patches from image patching module 344 and determine which of the classifiers of the arbitrated image classifier 348 will evaluate each of the patches. Patch-to-classifier matching can be based on each classifier of arbitrated image classifier 348 corresponding to a particular image characteristic such as: a zone of images, a color or hue of images, type of object appearing in images, etc. Continuing the previous example, each of the 17 created patches can be matched to a classifier, the first ten patches matched to classifiers corresponding to ten image zones, the next four patches matched to classifiers corresponding to the type of objects identified, and the final three patches matched to classifiers corresponding to the red, green, and blue hues. In some implementations, image patching module 344 can create more or fewer patches than there are classifiers in arbitrated image classifier 348. In various implementations, not every classifier will be matched with a patch, some classifiers may evaluate more than one patch, or some patches can be split or combined to assign a patch to every classifier. Matching patches to arbitrated image classifier classifiers is further described below in relation to block 410 of FIG. 4 and block 510 of FIG. 5.

Arbitrated image classifier 348 can include a configuration of multiple classifiers and an arbitrator. The classifiers in arbitrated image classifier 348 can be neural networks, deep neural networks, support vector machines, decision trees, Parzen windows, Bayes, or other types of classifiers. In various implementations, the classifiers in arbitrated image classifier 348 can all be of the same type or can be combinations of types. Arbitrated image classifier 348 can receive the patches from patch-to-classifier matching module 346 and apply the matched classifiers of the arbitrated image classifier 348 to their matched patch. Each applied classifier can return a result indicating whether the patch matched to that classifier indicates, at least in part, whether the image includes the particular feature(s) for which the arbitrated image classifier is searching. In various implementations, the classifier results can be a binary value, a binary value coupled with a confidence factor, a strength value indicating how strongly the patch indicates whether the image includes the particular feature(s), or a set of features indicated by the patch.

The arbitrator in arbitrated image classifier 348 can be configured to determine whether the received image includes the particular image feature based on one or more of the classification results from the classifiers of arbitrated image classifier 348. The arbitrator can make the feature determination by selecting one of the results or by performing a combination of two or more of the classification results. For example, the arbitrator can use a weighted combination of the classification results. In various implementations, the weighting factors can be the result of previous training of the arbitrated image classifier 348 or specified weights, such as based on a historical analysis of images indicating which portions of images are most likely to be indicative of the particular feature. As another example, the arbitrator can have a default, such as the image not having the defined feature, and only returning the opposite result (i.e. the image having the defined feature) if a threshold amount of classifiers return that opposite result. The threshold amount of classifiers can be, for example, 1, 33%, 50%, 75%, or 100%. As further examples, the arbitrator can: select the classification result with the highest confidence factor; average classification results, which may use confidence factors or strength values as average weights; combine classification results based on the type of patches analyzed by the classifiers, such as classifiers analyzing a patch created for an identified object can be given greater weight than a classifier analyzing a particular hue; or include a hierarchy of two or more levels for the classifiers, such as having identified a primary set of classifiers and only taking into account a set of results from secondary classifiers if the higher level classification is inconclusive (e.g. doesn't have a combined confidence factor above a specified threshold), which can be applied iteratively with further classifier levels. In some implementations, the particular feature the arbitrated image classifier 348 is searching for is objectionable content, such as sexual content, violent scenes, drug use, etc. Arbitrated image classifiers and applying an arbitrated image classifier are further described below in relation to blocks 404, 412, and 414 of FIG. 4 and blocks 504, 512, and 514 of FIG. 5.

When the image received by interface 342 is a training image associated with a label for the feature the arbitrated image classifier 348 is being trained to recognize, and when a result determined by the arbitrator of arbitrated image classifier 348 does not sufficiently match the associate label, arbitrated image classifier update module 350 can adjust parameters of the classifiers or arbitrator. This adjustment can be performed multiple times, re-evaluating the training image after each adjustment, until the arbitrated image classifier 348 sufficiently characterizes the image as having or not having the defined feature. Arbitrated image classifier update module 350 can adjust the weights of individual nodes of the classifiers of arbitrated image classifier 348 or arbitrated image classifier update module 350 can adjust weights used by the arbitrator of arbitrated image classifier 348 for the various classifiers. In some implementations, arbitrated image classifier update module 350 can make the same adjustment to each of the classifiers of arbitrated image classifier 348. In some implementations, arbitrated image classifier update module 350 can adjust how the image patching module 344 creates image patches or how patch-to-classifier matching module 346 matches patches to classifiers. Updating a classifier and arbitrator parameters are further described below in relation to blocks 416 and 418 of FIG. 4. Implementations that only apply a previously trained arbitrated image classifier may not include an arbitrated image classifier update module 350.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
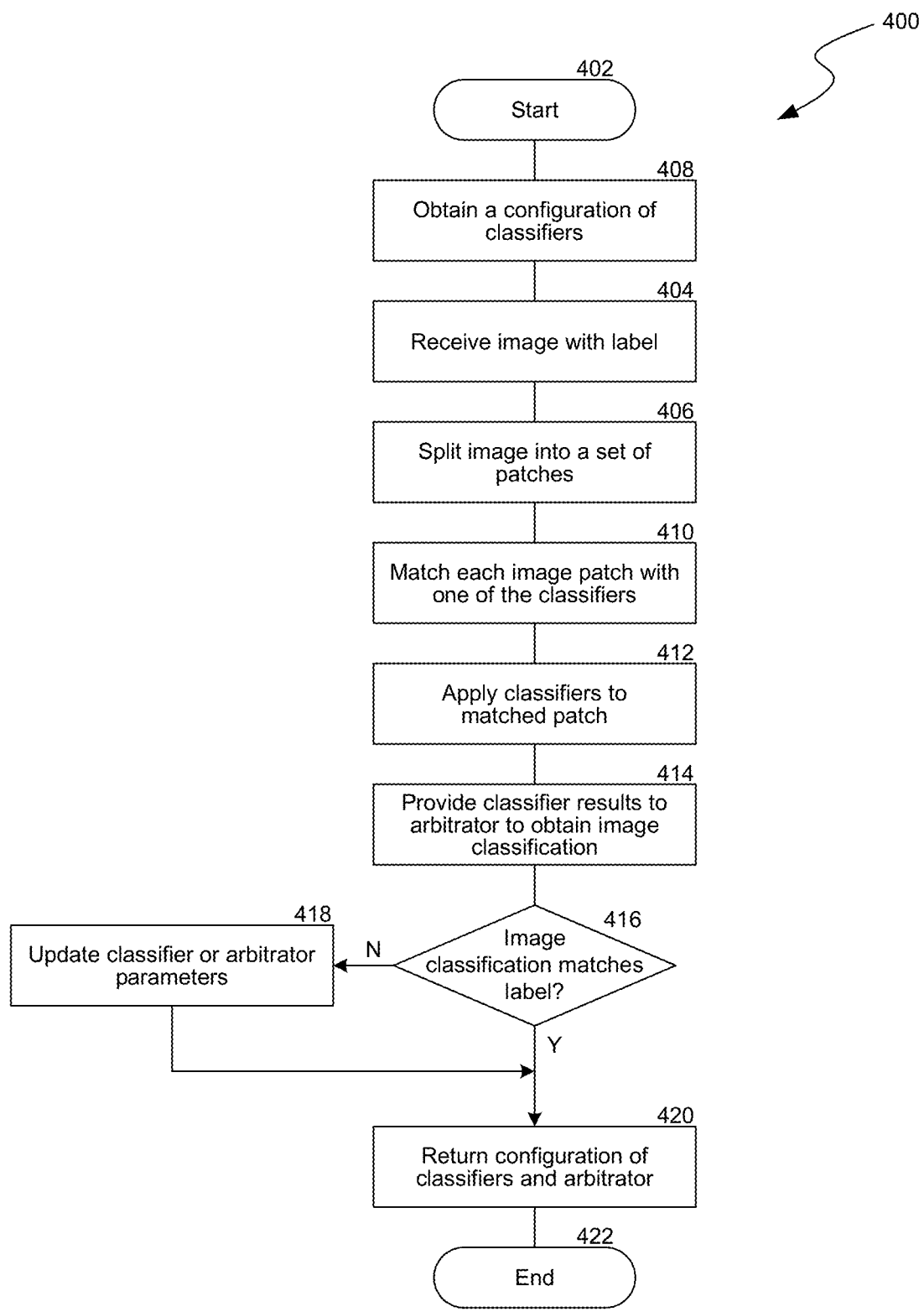
FIG. 4 is a flow diagram illustrating a process used in some implementations for training an arbitrated image classifier.

FIG. 4 is a flow diagram illustrating a process 400 used in some implementations for training an arbitrated image classifier. Process 400 begins at block 402 and continues to block 404. At block 404, process 400 obtains a configuration of classifiers and an arbitrator, referred to herein as an arbitrated image classifier. In some implementations, the classifiers are all deep neural networks. In various implementations, the classifiers can include classifiers such as other types of neural networks, support vector machines, Bayes classifiers, or combinations of multiple types of classifiers. The obtained configuration can be arranged such that output from the multiple classifiers is provided to the arbitrator.

At block 406, process 400 can receive an image with an associated label. In some implementations, the received image can come from transmission from a user device to a social media website server. In various implementations, the image can be from various sources such as a photo, a hand-made or computer generated drawing, a video, an animation, etc. The label associated with the image can indicate whether or not the image includes a feature which an arbitrated image classifier is to be trained to find. For example, the label can be whether or not the image contains objectionable content. Objectionable content, for example, can include sexual content, violent scenes, drug use, etc. Other examples of image features include whether images are appropriate or of interest for a particular audience (e.g. based on audience age, location, friend group, gender, content consumption history, etc.) or whether the image includes particular objects, particular logos or other brand information, particular faces, particular locations, security concerns, etc.

At block 408, the received image can be split into a set of patches. As discussed above, a patch of an image can be any data representing some subset of the image. In various implementations, patches can be areas of the image, objects identified in the image, non-consecutive potions of the image, the image or portions of the image with various transformations applied, etc. Image patching can be accomplished by applying various algorithms such as an algorithm that takes random image areas; an algorithm that takes semi-random image areas assuring the image areas are of a particular shape, size, or have connected pixels; an algorithm that divides an image based on edge analysis; or an algorithm that applies an established patch template. An algorithm that applies an established patch template can take image areas according to a grid, can iteratively take image portions until the entire image is divided into patches, or can otherwise deterministically divide an image into patches. In some implementations, the number of patches the image is divided into can correspond to the number of classifiers in the arbitrated image classifier received at block 404.

At block 410, the patches created at block 408 can be matched to one or more of the classifiers in the arbitrated image classifier received at block 404. In some implementations, the patches can be matched to classifiers based on a correspondence between factors used to create each patch and an assignment for each classifier to analyze those factors. For example, the patches can be matched to classifiers based on a correspondence between an image area the patch was taken from and an image zone assigned to each classifier. In some implementations, not all the classifiers may be matched to a patch when the number of patches created at block 408 is less than the number of classifiers in the arbitrated image classifier received at block 404. In some implementations, patches may be combined or multiple patches may be assigned to a single classifier when the number of patches created at block 408 is greater than the number classifiers in the arbitrated image classifier received at block 404.

At block 412, each classifier, of the arbitrated image classifier, that is matched to a patch at block 410 can be applied to the corresponding matched patch. Applying each classifier can depend on the type of classifiers in the received arbitrated image classifier. For example, where the classifiers are deep neural networks, the patch can be converted into a series of signals to input into a first row of nodes. The first row can then provide weighted signals to a subsequent row of nodes. These signals can be in various forms extracted from the image such as a column matrix, a feature vector, etc. This weighted input and output process can be repeated for as many rows are included in the deep neural network until an output row provides a result.

At block 414, the results of each classifier are provided to an arbitrator of the arbitrated image classifier. The arbitrator can use the classifier results to provide a determination of whether or not the received image includes the feature for which the arbitrated image classifier is being trained. In some implementations, the arbitrator can make this determination by combining results based on weights assigned to each classification result based on previous iterations of training. For example, each classifier in the arbitrated image classifier can initially be given a default or random weight. As image patches are presented to the classifiers, the arbitrator can combine the classification results using the assigned weight. As discussed below in relation to blocks 416 and 418, when the results of the combination are not sufficiently correct, the weights can be adjusted such that future iterations are more likely to provide correct results. Alternatively or in addition, the arbitrator can use a trained threshold value to specify a binary result of whether or not the image includes a particular feature. For example, the combination of the classification results, which may or may not account for individual result weights, can be computed as a score. For example, a score could indicate that the image is 67% likely to contain objectionable content. A previous trained threshold value can specify that a score of 73% is required to classify an image as containing objectionable content. Thus, the image will not be classified as having objectionable content. However, in this example, the label for that image specifies that it does contain objectionable content, so the required threshold value can be lowered. In some implementations, the classification weights or the threshold value can be manually selected.

In some implementations, the arbitrator can be programmed with an alternate algorithm to determine whether the received image includes the specified feature, such as requiring unanimous classification results to override a default. For example, a default can be that an image includes objectionable content, and only if all classification results indicate that no objectionable content was found in the corresponding patch will the result be changed to classify the image as not having objectionable content.

In some implementations, the arbitrator can compute a confidence factor to include with, or as, a result. For example, a resulting weighted average of the classification results can be placed on a continuum to provide a measure of how far that combined result is from the center of the continuum. As another example, where a threshold value is required for making the binary determination of whether the image includes a particular feature, how far above or below the threshold a final score is can be used as a confidence factor.

At block 416, the image classification found by the arbitrator in block 414 is compared to the label associated with the image received at block 406. If the classification matches the label, process 400 continues to block 420. If the classification does not match the label, process 400 continues to block 418. In some implementations, matching can take into account a required threshold level of accuracy. For example, a result from the arbitrator can be a score or can be associated with a confidence value. Even if the overall result from the arbitrator is the same as the associated image label, process 400 can determine that the result does not sufficiently match the associated image label if the score or confidence factor is not above a threshold level.

At block 418, updates are made to parameters of the classifiers or arbitrator. These updates can include changing classification parameters for individual classifiers, changing weights used for combining classifier results, changing a threshold value used to determine whether a final score indicates that the received image does or does not include the feature for which the arbitrated image classifier is being trained, or parameters used to determine a confidence value. Where at least some of the classifiers are a type of neural network, the updating can include adjusting weights assigned to various nodes within the neural network. Where at least some of the classifiers are a type of support vector machine, the updating can include adjusting a hyperplane. In some implementations, the same change is made to each of the classifiers in the arbitrated image classifier that are of the same type. Adjusting parameters of the arbitrator can include adjusting the weight given to each classifier result.

In some implementations, the changes made by process 400 at block 418 can also include modifications to how an image is divided into patches at block 408, such as by changing the regions indicated by an established patching template. In some implementations, the changes made by process 400 at block 418 can also include modifications to how patches are matched to classifiers at block 410, such as by changing an image zone assigned to a classifier or by adjusting the category of identified objects found in patches that correspond to a classifier. In some implementations, the amount of adjustment made can correspond to how close an arbitrator-generated score is to correctly identifying the feature for which the arbitrated image classifier is being trained. For example, if the arbitrator provides a score of 36/100 that an image has objectionable content, where the image is associated with an objectionable content label, a large update to classifier or arbitrator parameters can occur, whereas if the score was 89/100, a correspondingly smaller update can occur.

At block 420, the arbitrated image classifier configuration, with any updates made at block 418, can be returned. This arbitrated image classifier can then be further trained by applying additional pre-labeled images using process 400, can be further trained by re-applying images until the classification is sufficiently correct or to ensure that an adjustment made from training another image did not result in detrimental results for inspecting other images, or can be used by another process, such as process 500 described below, for analyzing new images that have not been pre-labeled to indicate whether or not they contain the features for which the arbitrated image classifier is trained. Process 400 then continues to block 422, where it ends.

Figure 5:
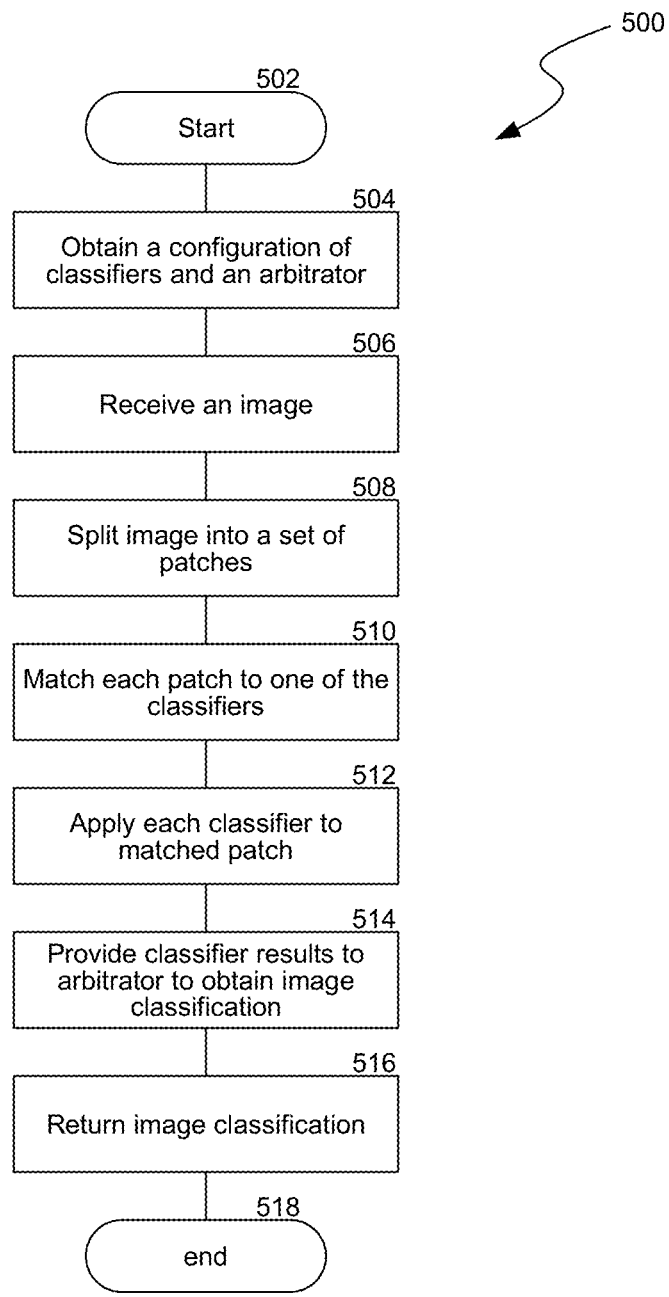
FIG. 5 is a flow diagram illustrating a process used in some implementations for applying a trained arbitrated image classifier to classify a received image.

FIG. 5 is a flow diagram illustrating a process 500 used in some implementations for applying a trained arbitrated image classifier to classify a received image. Process 500 begins at block 502 and continues to block 504. At block 504, process 500 obtains an arbitrated image classifier (i.e. a configuration of classifiers and an arbitrator) trained, such as using process 400, to identify whether or not an image includes a particular feature. In some implementations, the classifiers are all deep neural networks. The obtained configuration can be arranged such that output from the multiple classifiers is provided to the arbitrator. At block 506, an image is received. This is an image that process 500 can analyze to determine whether or not it includes the particular feature.

At block 508, process 500 can divide the received image into a set of patches. This can be done using the same patch dividing process used in training the received arbitrated image classifier at block 408 of process 400. At block 510, process 500 can match the patches created in block 508 to the classifiers of the arbitrated image classifier received at block 504. This can be done using the same matching process used in training the received arbitrated image classifier at block 410 of process 400. At block 512, process 500 can apply the classifiers in the received arbitrated image classifier to compute classification results, which at block 514 can be provided to the arbitrator of the received arbitrated image classifier to obtain an image classification of whether or not the received image includes the feature for which the received arbitrated image classifier was trained. This result can, in various implementations, be a binary value or a score, and may or may not be associated with a confidence factor. This application of the classifiers and arbitrator of the arbitrated image classifier can be done using the same process used in training the received arbitrated image classifier at block 412 and 414 of process 400. In some implementations, a arbitrator result can be indeterminate, indicating that the classification process did not provide a definite result, did not provide a score above or below a threshold level, or was not associated with a sufficiently high confidence factor.

At block 516, the image classification found in block 514 can be returned. This image classification can be used, for example, to prevent images from being shown or included in a social media system, to identify images that contain proprietary images such as trademarks, to restrict audiences that can view images such as by age or location, etc. If the image classification is indeterminate, the image can be flagged for further analysis such as for applying additional computational classification or for human review. Once an image classification is returned, process 500 continues to block 518, where it ends.

Figure 6:
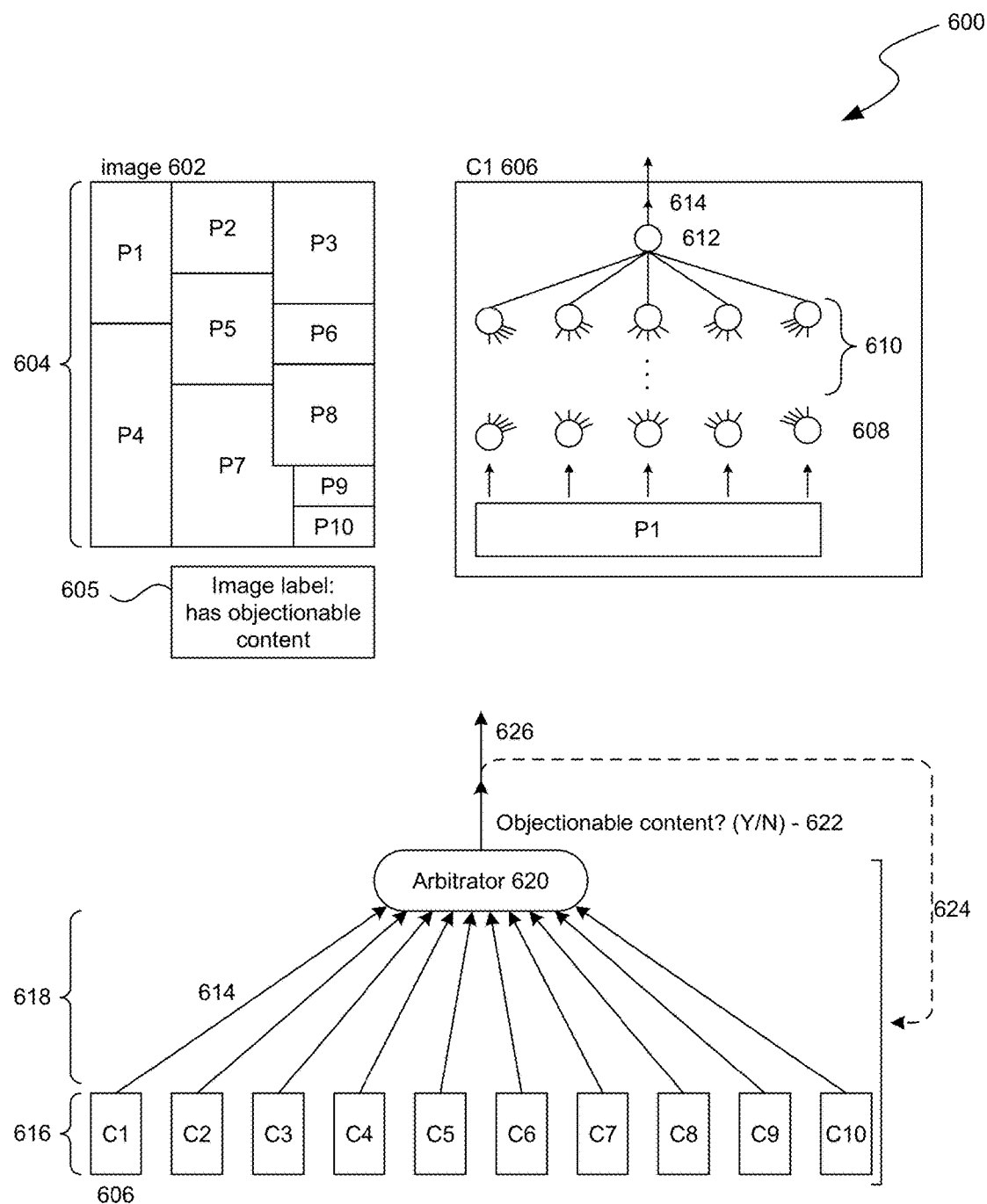
FIG. 6 is an example illustrating patching a received image and either applying a trained arbitrated image classifier to classify the image or using a classification of the received image to train an arbitrated image classifier.

FIG. 6 is an example 600 illustrating patching a received image and either applying a trained arbitrated image classifier to classify the image or using a label assigned to the received image to train the arbitrated image classifier. Example 600 includes image 602 and an arbitrated image classifier including classifiers 616 and arbitrator 620. Where example 600 is for training the arbitrated image classifier, image 602 will include a label 605 indicating whether or not the image includes a feature for which the arbitrated image classifier is being trained. The arbitrated image classifier includes deep neural network classifiers 616, enumerated in example 600 as classifiers C1-C10, and an arbitrator 620 which are connected using weighted connections 618.

Example 600 begins by dividing image 602 into a set of patches 604, enumerated in example 600 as patches P1-P10. In this example, an established patching template is applied to image 602 to create patches 604. The established patching template can be automatically scaled to fit the size of the image 602 or can define patches in terms of percentages. For example, patch P1 can be defined in the established patching template as the area including the topmost 33% of the image by the leftmost 20% of the image and patch P2 can be defined in the established patching template as the area including the 40% of the image to the right of patch P1 and the topmost 25% of the image, etc. In example 600, applying the established patching template is configured to produce ten patches, one corresponding to each of the classifiers 616.

Next, in example 600, each of the patches 604 are matched to one of the classifiers 616 of the arbitrated image classifier. In example 600, each classifier is configured to analyze an image zone corresponding to one of the patching areas defined by the established patching template. Thus, for example, patch P1 will be provided to classifier C1, patch P5 will be provided to classifier C5, etc.

Each of the patches 604 is then analyzed by its corresponding classifier from classifiers 616. An example of applying a classifier to a patch is shown at 606 for classifier C1 and patch P1. At 606, patch P1 is converted into one or more input signals which are provided to nodes at input layer 608. Each node in classifier C1 is a representation of a function that transforms a received input signal into an output signal. Classifier C1 can be structured such that each node at each layer, starting with the input layer 608, is connected (i.e. provides an output signal) to each node in the next layer of the one or more hidden layers 610. The nodes in the final hidden layer 610 then provide their output signals to an output node 612, whose output signal 614 is the output for classifier C1. Each node in classifier C1 can have a weighing factor for each signal it receives. Thereby, as adjustments to weighing factors are performed when training classifier C1, various outputs 614 can be achieved for a given input patch.

When the classifiers 616 have computed a classification result for each corresponding patch 604, the results are provided through connections 618 to arbitrator 620. Each of the connections 618 can have a trained weight which can be used by arbitrator 620 to compute a classification 622 for image 602. In implementations where the arbitrated image classifier is being trained, classification 622 is compared to classification 605, and if they do not match, at 624, updates are performed by changing parameters defining weights between the nodes of classifiers 616 or by changing parameters controlling the weights of connections 618. In example 600, when a change to classifier parameters is made, the same change is made to each of the classifiers 616. In implementations where a image label is not previously known, the output 622 can be provided at 626 as the indication of whether or not the image includes the feature (s) for which the arbitrated image classifier was trained.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items (i.e. "A, B, or C" means at least one of: A, B, C, or any combination thereof). For example, the phrase "A, B, or C" refers to any of A; B; C; A and B; A and C; B and C; A, B, and C; or multiple of any item such as A and A; B, B, and C; or A, A, B, C, and C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for training an arbitrated image classifier to identify objectionable content, comprising:
   obtaining the arbitrated image classifier comprising a configuration of multiple classifiers and an arbitrator, wherein each of the multiple classifiers in the configuration is associated with an image zone;
   receiving an image associated with a label;
   splitting the received image into a set of patches;
   matching each patch, from the set of patches, to one of the multiple classifiers, wherein matching each patch, from the set of patches, to one of the multiple classifiers comprises:
      determining an area of the received image from which that patch originated; and
      matching the area to one of the image zones;
   generating, by the matched classifiers, classification results, wherein individual ones of the classification results correspond to a patch from the set of patches;
   providing the classification results to an arbitrator;
   computing, by the arbitrator, an image classification, wherein the image classification is based on one or more of the classification results;
   determining that the image classification does not match the label; and
   in response to determining that the image classification does not match the label, updating parameters of the arbitrated image classifier.

2. The method of claim 1, wherein each of the multiple classifiers in the configuration is a deep neural network.

3. The method of claim 1, wherein each of the multiple classifiers in the configuration is a support vector machine.

4. The method of claim 1, wherein dividing the image into patches is performed by applying an established patch template.

5. The method of claim 1, wherein dividing the image into patches is performed using a randomization algorithm.

6. The method of claim 1,
   wherein each classification result is associated with a weight value based on the image zone associated with the classifier that generated that classification result; and
   wherein computing, by the arbitrator, the image classification uses an algorithm that accounts for the weight values associated with the classification results.

7. The method of claim 1,
   wherein each classification result is associated with a weight value; and
   wherein computing, by the arbitrator, the image classification uses an algorithm that accounts for the weight values associated with the classification results.

8. The method of claim 1, wherein the label indicates that the image contains sexual content.

9. The method of claim 1,
   wherein the label indicates that the image contains sexual content, and
   wherein none of the classification results indicate that the corresponding patch contains sexual content.

10. The method of claim 1, wherein updating parameters of the arbitrated image classifier comprises one or more of:
    adjusting one or more weight values associated with individual ones of the multiple classifiers;
    adjusting internal parameters of one or more of the multiple classifiers;
    modifying an image zone associated with one or more of the multiple classifiers;
    modifying an established patch template; or
    any combination thereof.

11. The method of claim 1, wherein the received image is a frame from a video file.

12. A method for applying an arbitrated image classifier to identify an image feature, the method comprising:
    obtaining the arbitrated image classifier comprising a configuration of multiple classifiers and an arbitrator, the configuration trained using training data labeled for the image feature, wherein each of the multiple classifiers in the configuration is associated with an image zone;
    receiving an image;
    splitting the received image into a set of patches;
    matching each patch, from the set of patches, to one of the multiple classifiers, wherein matching each patch, from the set of patches, to one of the multiple classifiers comprises:
       determining an area of the received image from which that patch originated; and
       matching the area to one of the image zones;
    generating, by the matched classifiers, classification results for the image feature, wherein individual ones of the classification results correspond to a patch from the set of patches;
    providing the classification results to an arbitrator;
    computing, by the arbitrator, an image classification identifying whether the received image contains the image feature, wherein the image classification is based on one or more of the classification results; and
    providing the image classification.

13. The method of claim 12,
    wherein each classification result is associated with a weight value; and
    wherein computing, by the arbitrator, the image classification uses an algorithm that accounts for the weight values associated with the classification results.

14. The method of claim 12, wherein each of the multiple classifiers in the configuration is a deep neural network.

15. The method of claim 12, wherein dividing the image into patches is performed by applying an established patch template.

16. The method of claim 12, wherein the image feature is whether or not sexual content is present.

17. A system for training an arbitrated image classifier to identify objectionable content comprising:
    a memory;
    a network interface configured to:
       obtain the arbitrated image classifier, the arbitrated image classifier comprising a configuration of multiple classifiers and an arbitrator, wherein each of the multiple classifiers in the configuration is associated with an image zone; and
       receive an image associated with a label; and
    one or more processors configured to:
       split the received image into a set of patches;
       match each patch, from the set of patches, to one of the multiple classifiers of the arbitrated image classifier, wherein matching each patch, from the set of patches, to one of the multiple classifiers comprises:
          determining an area of the received image from which that patch originated; and
          matching the area to one of the image zones;
       use the matched classifiers of the arbitrated image classifier to compute classification results, wherein individual ones of the classification results correspond to a patch from the set of patches;
use the arbitrator to compute an image classification, wherein the image classification is based on one or more of the classification results;
determine that the image classification does not match the label; and
in response to determining that the image classification does not match the label, update:
weights associated with classification results from at least one of the classifiers of the arbitrated image classifier; and
internal features of one or more of the classifiers used to create classification results by those one or more classifiers.

18. The system of claim 17, wherein the one or more processors use the arbitrator to compute an image classification by applying an algorithm that accounts for the weights associated with a classification results.

19. The system of claim 17, wherein the received image is a frame from a video file.

20. The system of claim 17, wherein each classification result is associated with a weight value based on the image zone associated with the classifier that generated that classification result; and
wherein computing, by the arbitrator, the image classification uses an algorithm that accounts for the weight values associated with the classification results.

* * * * *